United States Patent
Xu et al.

(10) Patent No.: US 12,556,680 B2
(45) Date of Patent: Feb. 17, 2026

(54) FAULT LOCATION METHOD, FAULT LOCATION SYSTEM, AND VIDEO MANAGEMENT SYSTEM

(71) Applicant: CRSC COMMUNICATION & INFORMATION GROUP COMPANY LTD., Beijing (CN)

(72) Inventors: Yaping Xu, Beijing (CN); Tianjiao Yang, Beijing (CN); Jingfeng Zhang, Beijing (CN); Zuo Guan, Beijing (CN)

(73) Assignee: CRSC COMMUNICATION & INFORMATION GROUP COMPANY LTD., Beijing (CN)

( * ) Notice: Subject to any disclaimer, the term of this patent is extended or adjusted under 35 U.S.C. 154(b) by 417 days.

(21) Appl. No.: 18/028,511

(22) PCT Filed: Sep. 30, 2021

(86) PCT No.: PCT/CN2021/122236
§ 371 (c)(1),
(2) Date: Mar. 24, 2023

(87) PCT Pub. No.: WO2022/193617
PCT Pub. Date: Sep. 22, 2022

(65) Prior Publication Data
US 2023/0336706 A1    Oct. 19, 2023

(30) Foreign Application Priority Data
Mar. 16, 2021    (CN) .......................... 202110279279.1

(51) Int. Cl.
*H04N 17/00*    (2006.01)
*G06T 7/00*    (2017.01)

(52) U.S. Cl.
CPC ......... *H04N 17/002* (2013.01); *G06T 7/0002* (2013.01); *G06T 2207/10016* (2013.01); *G06T 2207/30168* (2013.01)

(58) Field of Classification Search
CPC ................ H04N 17/002; G06T 7/0002; G06T 2207/10016; G06T 2207/30168
See application file for complete search history.

(56) References Cited

U.S. PATENT DOCUMENTS

| | | | |
|---|---|---|---|
| 6,353,902 B1 | 3/2002 | Kulatunge et al. | |
| 2009/0064255 A1* | 3/2009 | Jiang | H04N 21/44227 725/118 |

(Continued)

FOREIGN PATENT DOCUMENTS

| | | |
|---|---|---|
| CN | 201699879 U | 1/2011 |
| CN | 102387038 A | 3/2012 |

(Continued)

OTHER PUBLICATIONS

China Patent Office, First Office Action dated Apr. 18, 2022, for corresponding Chinese application 202110279279.1.
WIPO, International Search Report issued on Jan. 4, 2022.

*Primary Examiner* — Kyu Chae
(74) *Attorney, Agent, or Firm* — Li & Cai Intellectual Property (USA) Office (57) ABSTRACT

The present disclosure provides a fault location method, a fault location system, and a video management system, and relates to the technical field of network communication. The fault location method includes: determining, in response to a case where it is determined that a target video from a video acquisition system has a fault, a network identifier of a target camera corresponding to the target video; extracting target alarm data corresponding to the network identifier from current alarm data of the video acquisition system according to the network identifier of the target camera; and determin- (Continued)

ing a fault cause of the video acquisition system according to a preset corresponding relationship between fault events and alarm information, and the target alarm data. The present disclosure can be used for centralized management and operation and maintenance of devices and systems related to video services.

11 Claims, 4 Drawing Sheets

(56) References Cited

U.S. PATENT DOCUMENTS

| | | | |
|---|---|---|---|
| 2014/0285659 A1* | 9/2014 | Kim | H04N 7/183 |
| | | | 348/143 |
| 2021/0004950 A1* | 1/2021 | Kondamari | G06T 7/0002 |
| 2022/0174370 A1* | 6/2022 | Jackson | H04N 21/4363 |

FOREIGN PATENT DOCUMENTS

| | | |
|---|---|---|
| CN | 202160184 U | 3/2012 |
| CN | 202282837 U | 6/2012 |
| CN | 103731643 A | 4/2014 |
| CN | 105430380 A | 3/2016 |
| CN | 107294744 A | 10/2017 |
| CN | 107959847 A | 4/2018 |
| CN | 110535711 A | 12/2019 |
| CN | 110635954 A | 12/2019 |
| CN | 113038122 A | 6/2021 |
| EP | 2911387 A1 | 8/2015 |

* cited by examiner

FAULT LOCATION METHOD, FAULT LOCATION SYSTEM, AND VIDEO MANAGEMENT SYSTEM

TECHNICAL FIELD

The present disclosure relates to the technical field of network communication, and in particular, to a fault location method, a fault location system, and a video management system.

BACKGROUND

At present, a management range of a video management system of railways becomes wider and wider, and the access capacity of full-rail cameras is over a hundred thousand. Therefore, it is of important significance to perform effective operation and maintenance on the video management system, especially to perform fault location on the video management systems.

When an existing operation and maintenance system determines that a fault occurs in the video management system, alarm information of software and hardware equipment of the video management system is typically presented only in a stacking manner, and an operation and maintenance administrator determines a cause of the fault by manually analyzing the alarm information, resulting in an extremely large workload of the operation and maintenance administrator, which further leads to a relatively high operation and maintenance cost of the video management system of the railways, thus affecting normal operation of railway systems.

SUMMARY

In view of the above problems, an objective of the present disclosure is to provide a fault location method, a fault location system, and a video management system, which can determine a cause of a video fault and automatically locate the fault.

In order to achieve the above objective, the present disclosure adopts the following technical solutions.

In the first aspect, the present disclosure provides a fault location method, including: determining, in response to a case where it is determined that a target video from a video acquisition system has a fault, a network identifier of a target camera corresponding to the target video; extracting target alarm data corresponding to the network identifier from current alarm data of the video acquisition system according to the network identifier of the target camera; and determining a fault cause of the video acquisition system according to a preset corresponding relationship between fault events and alarm information, and the target alarm data.

In some embodiments, the alarm information includes: alarm types and alarm objects, and the corresponding relationship between the fault events and the alarm information includes: the corresponding relationship between the alarm types, the alarm objects, and the fault events; determining the fault cause of the video acquisition system according to the preset corresponding relationship between the fault events and the alarm information, and the target alarm data includes: performing, for each piece of target alarm data, the following processing procedures: extracting a target alarm type and a target alarm object corresponding to the target alarm data from the target alarm data; and searching the corresponding relationship between the fault events and the alarm information to determine a fault event corresponding to the target alarm type and the target alarm object; and determining, after all pieces of target alarm data are subjected to the above processing procedures, all fault events corresponding to all pieces of target alarm data, as the fault cause of the video acquisition system.

In some embodiments, the alarm types comprise: a disconnection alarm of network link, an offline alarm of service status, and an overload alarm of load capacity.

In some embodiments, before extracting the target alarm data corresponding to the network identifier from the current alarm data of the video acquisition system according to the network identifier of the target camera, the fault location method further includes: collecting the current alarm data of the video acquisition system; and subjecting the current alarm data to preprocessing which includes: data convergence and/or standard format conversion.

In some embodiments, before determining, in response to the case where it is determined that the target video from the video acquisition system has the fault, the network identifier of the target camera corresponding to the target video, the fault location method further includes: determining whether the target video has the fault.

In some embodiments, the target video includes: a real-time video; and determining whether the target video has the fault includes: diagnosing whether the real-time video has a problem of no video signal.

In some embodiments, the target video includes: a pre-recorded video; and determining whether the target video has the fault includes: diagnosing whether the pre-recorded video has a video loss problem.

In the second aspect, the present disclosure further provides a fault location system, including: a determination module configured to determine, in response to a case where it is determined that a target video from a video acquisition system has a fault, a network identifier of a target camera corresponding to the target video; an extraction module configured to extract target alarm data corresponding to the network identifier from current alarm data of the video acquisition system according to the network identifier of the target camera determined by the determination module; and a location module configured to determine a fault cause of the video acquisition system according to a preset corresponding relationship between fault events and alarm information, and the target alarm data extracted by the extraction module.

In some embodiments, the system further includes: a network management module configured to collect the current alarm data of the video acquisition system, and subject the current alarm data to preprocessing which includes: data convergence and/or standard format conversion.

In some embodiments, the system further includes: an image quality diagnosis module configured to determine whether the target video has the fault.

In the third aspect, the present disclosure further provides a video management system, including: a video acquisition system including a front-end camera and a video service system, with the front-end camera configured to take videos, and the video service system configured to receive the videos captured by the front-end camera and provide a video service for a client; and a fault location system including the fault location system provided herein.

In some embodiments, the video service system includes: a management server, a distributing-forwarding server, a switch, and/or a storage server.

Due to the above technical solutions, the present disclosure has the following advantages: with the fault location method, the fault location system, and the video management system provided by the embodiments of the present disclosure, the target alarm data relevant to a current fault is screened out from the massive alarm data based on the network identifier of the target camera corresponding to the target video having the fault, and the fault event corresponding to the target alarm data is determined by matching the target alarm data screened out with the preset corresponding relationship between the fault events and the alarm information, thus determining the cause of the current fault. Compared with the prior art, the present disclosure can realize cause location for the video having the fault, so that a workload of operation and maintenance administrators can be reduced, and operation and maintenance efficiency can be increased, thereby increasing system operation efficiency.

BRIEF DESCRIPTION OF DRAWINGS

Various additional advantages and benefits will become apparent to those of ordinary skill in the art upon reading the following detailed description of the preferred embodiments. The drawings are only intended to illustrate the preferred embodiments, and should not be considered as the limitations on the present disclosure. The same reference numerals are used to refer to the same components throughout the drawings. In the drawings.

DETAIL DESCRIPTION OF EMBODIMENTS

The exemplary embodiments of the present disclosure will be described in detail below with reference to the drawings. Although the drawings show the exemplary embodiments of the present disclosure, it should be understood that the present disclosure may be implemented in various forms and should not be limited to the embodiments described herein. On the contrary, the embodiments are provided to facilitate thorough understanding of the present disclosure and fully convey the scope of the present disclosure to those of ordinary skill in the art.

It should be understood that the terms used herein are only for the purpose of describing particular exemplary embodiments, but are not intended to impose limitations. Unless expressly stated in the context, "a", "one", and "the" which indicate a singular form may indicate a plural form herein. The terms "include", "comprise", "contain" and "have" are inclusive and therefore indicate the presence of the described features, steps, operations, elements and/or components, but do not exclude the presence or addition of one or more other features, steps, operations, elements, components and/or combinations thereof. The steps, procedures, and operations of the method described herein are not interpreted as being required to be performed in the specific execution order described or illustrated herein, unless the execution order is expressly indicated. It should be further understood that additional or alternative steps may be used.

For the convenience of description, spatially relative terms such as "inner", "outer", "inside", "outside", "below" and "above" may be used herein to describe a relationship between one element or feature and another element or feature shown in the drawings illustrated in the figures. Those spatially relative terms are intended to include different orientations of devices in use or in operation in addition to the orientations illustrated in the drawings.

Figure 1:
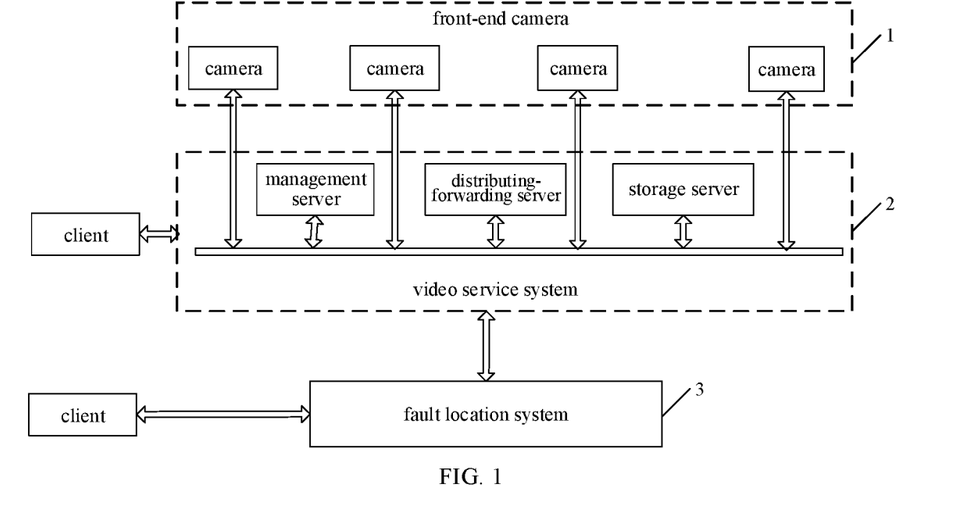
FIG. 1 is a schematic structural diagram of a video management system according to the embodiments of the present disclosure.

FIG. 1 is a schematic structural diagram of a video management system according to the embodiments of the present disclosure. As shown in FIG. 1, in the embodiments of the present disclosure, the video management system includes a video acquisition system and a fault location system 3, the video acquisition system includes a front-end camera 1 and a video service system 2, and the video service system 2 and the fault location system 3 may be connected to their respective corresponding clients; the front-end camera 1 includes at least one camera for taking videos, each camera is provided with a unique network identifier (such as an IP address), and the camera is preferably a full-rail camera; the video service system 2 is connected to the front-end camera 1, and is configured to receive the videos captured by the front-end camera 1 and provide a video service for the client, for example, providing the video service for the client may include receiving a video viewing instruction (including an instruction to view a real-time video or an instruction to view a pre-recorded and pre-stored video) sent by the client, and feeding back a corresponding video to the client in response to the instruction; and the fault location system 3 is connected to the video service system 2, and is configured to perform fault location on the video when the video provided by the video service system 2 for the client has a fault, which may be caused by the front-end camera 1 or the video service system 2.

In some embodiments, the video service system 2 may include: a management server, a distributing-forwarding server, and a switch, and may further include a storage server; the switch is used for data communication and interaction between any two of the servers, that is, performable communication and data interaction between any two of the servers may be realized based on the switch; the management server is configured to receive an instruction such as the video viewing instruction or signaling sent by the client; the distributing-forwarding server is configured to identify an IP address in an instruction or signaling sent by the management server, and forward the instruction or the signaling to a camera corresponding to the IP address; the storage server is configured to provide a video storage service; and in some embodiments, the video service system 2 may further include a storage medium connected to the storage server for storing recorded videos.

In practical applications, through the client, a user may perform communication and interaction with the video service system 2 connected to the client to acquire a corresponding video for viewing.

Figure 2:
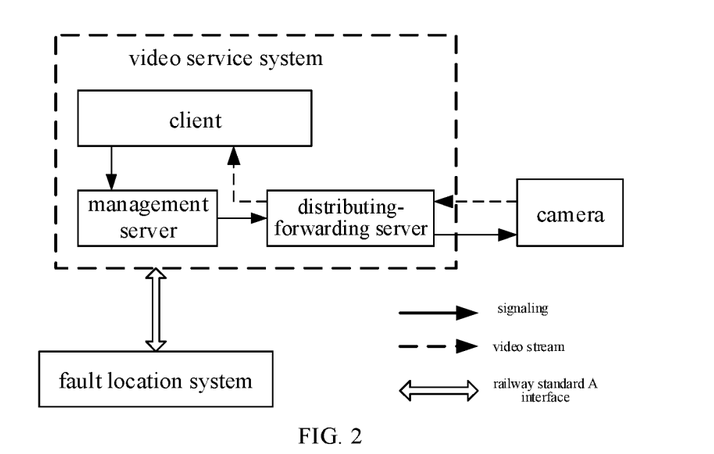
FIG. 2 is a schematic diagram of a process of acquiring a real-time video according to the embodiments of the present disclosure.

With reference to FIG. 2 which is schematic diagram of a process of acquiring a real-time video according to the embodiments of the present disclosure, specifically, when the user wants to view a real-time video, the user sends a video viewing instruction through the client; the management server sends, after receiving the video viewing instruction, the video viewing instruction to the corresponding distributing-forwarding server through the switch (not shown); the distributing-forwarding server analyzes the instruction to determine a network identifier of a camera corresponding to the video viewing instruction, and then sends the video viewing instruction to the corresponding camera through the switch (not shown); the camera then returns a captured real-time video stream to the distributing-forwarding server through the switch (not shown), and then the distributing-forwarding server sends the real-time video stream from the camera to the client for the user to view in real time.

Figure 3:
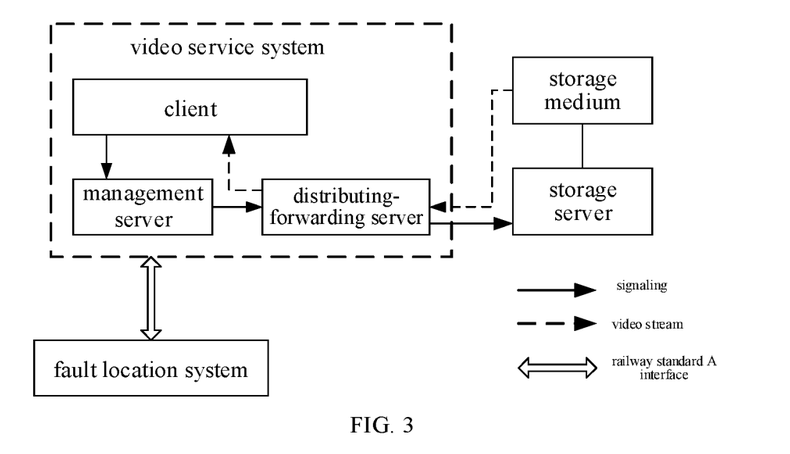
FIG. 3 is a schematic diagram of a process of acquiring a pre-recorded video according to the embodiments of the present disclosure.

With reference to FIG. 3 which is a schematic diagram of a process of acquiring a pre-recorded video according to the embodiments of the present disclosure, specifically, when the user wants to view a pre-recorded and pre-stored video, the user sends a video viewing instruction through the client; the management server sends, after receiving the video viewing instruction, the video viewing instruction to the corresponding distributing-forwarding server through the switch (not shown); the distributing-forwarding server analyzes the instruction to determine that a receiver of the video viewing instruction is the storage server, and then sends the video viewing instruction to the storage server through the switch (not shown); the storage server sends the video viewing instruction to the storage medium; the storage medium returns the corresponding pre-recorded video to the distributing-forwarding server, and then the distributing-forwarding server sends the pre-recorded and pre-stored video to the client for the user to view.

Figure 4:
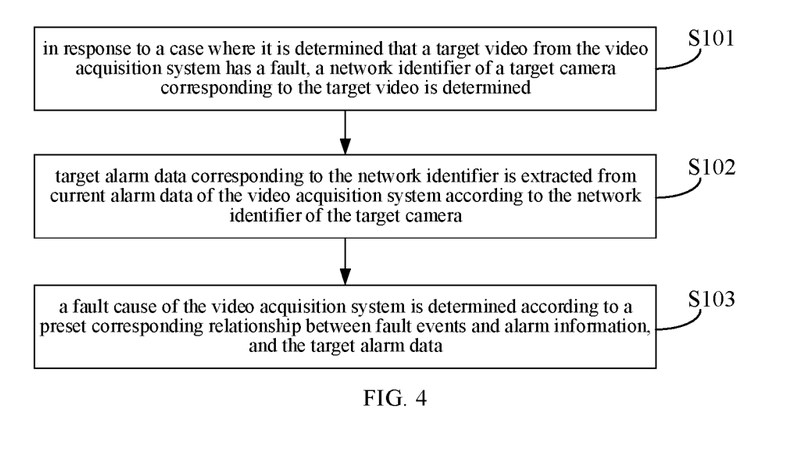
FIG. 4 is a flowchart illustrating a fault location method according to the embodiments of the present disclosure.

FIG. 4 is a flowchart illustrating a fault location method according to the embodiments of the present disclosure, and the fault location method according to the embodiments of the present disclosure is implemented based on the fault location system 3 described above. With reference to FIG. 4, the fault location method according to the embodiments of the present disclosure includes the following steps S101 to S103.

In step S101, in response to a case where it is determined that a target video from the video acquisition system has a fault, a network identifier of a target camera corresponding to the target video is determined.

In the embodiments of the present disclosure, the fault location system is connected to the video service system in the video acquisition system, a fault may occur in the video service system when the video service system calls the target video in response to the video viewing instruction sent by the client, and the fault location system acquires the network identifier of the target camera corresponding to the target video when determining that the target video has a fault. The target video may be the real-time video or the pre-recorded and pre-stored video.

In some embodiments, when the target video is the real-time video, the fault location system may extract the network identifier of the target camera corresponding to the target video from the video viewing instruction by analyzing the video viewing instruction; and when the target video is the pre-recorded and pre-stored video, the fault location system may acquire video file information (such as a video file name), which includes the network identifier of the target camera corresponding to the target video, corresponding to the target video from the video viewing instruction by analyzing the video viewing instruction, thereby acquiring the network identifier of the target camera.

In step S102, target alarm data corresponding to the network identifier is extracted from current alarm data of the video acquisition system according to the network identifier of the target camera.

In the embodiments of the present disclosure, the alarm data is generated when a fault occurs in a hardware device or a software system in the video acquisition system during an operation process, and the fault location system can collect and store the alarm data. Each piece of alarm data includes a network identifier of a camera.

After the fault location system determines the network identifier of the target camera, the target alarm data corresponding to the network identifier is extracted from the current alarm data stored, so that the alarm data relevant to a current fault is screened out.

In step S103, a fault cause of the video acquisition system is determined according to a preset corresponding relationship between fault events and alarm information, and the target alarm data.

In a practical system operation process, the fault of the target video may be caused by reasons in a plurality of aspects, for example, the fault cause may include: a hardware fault, a service fault, and a cluster fault, wherein the hardware fault mainly refers to a network link online status fault of a hardware device (such as the switch being disconnected, or the camera being offline), the service fault mainly refers to an online status failure of a service status (such as a management service being offline, or a storage service being offline), and the cluster fault mainly refers to an overload status fault of load capacity (such as the management service being overloaded, or a distributing-forwarding service being overloaded). By analyzing a flow direction of the video stream in the system in advance, troubleshooting logic used when performing fault location on the video may be defined. Specifically, as can be seen from the process of acquiring the real-time video shown in FIG. 2, an order of the signaling for the user to view the real-time video is requesting the management service, performing the relevant distributing-forwarding service, locating the camera, sending the real-time video stream by the camera, performing the distributing-forwarding service, and sending to the client, so when the real-time video has a fault, the troubleshooting of the hardware fault may be performed in the order of the management server-the switch-the distributing-forwarding server-the switch-the camera, and the troubleshooting of the service fault may be performed in the order of the management service and the distributing-forwarding service; similarly, as can be seen from the process of acquiring the pre-recorded and pre-stored video shown in FIG. 3, an order of the signaling for the user to view the pre-recorded and pre-stored video is requesting the management service, performing the relevant distributing-forwarding service, performing the storage service, reaching the storage medium, sending the pre-recorded and pre-stored video stream by the storage medium, performing the distributing-forwarding service, and sending to the client, so when the pre-recorded and pre-stored video has a fault, the troubleshooting of the hardware fault may be performed in the order of the management server-the switch-the distributing-forwarding server-the switch-the storage server-the storage medium, and the troubleshooting of the service fault may be performed in the order of the management service, the distributing-forwarding service, and the storage service.

In the embodiments of the present disclosure, the corresponding relationship between the fault events and the alarm information is preset according to the flow directions of the video stream and the signaling, and includes one-to-one correspondence between various types of fault events and the alarm information. The fault cause of the video can be clearly located according to the corresponding relationship, and the corresponding relationship between the fault events and the alarm information can be summarized by those of ordinary skill in the art according to experience and stored in the fault location system; correspondingly, the alarm data may further include the alarm information which represents a general situation of the generation of the alarm data.

According to the embodiments of the present disclosure, the fault cause of the video acquisition system can be determined by comparing the target alarm data with the preset corresponding relationship between the fault events and the alarm information.

In some specific implementations, the alarm information may include alarm types and alarm objects, the alarm types may specifically include a disconnection alarm of network link, an offline alarm of service status, and an overload alarm of load capacity and the like, and the alarm objects may specifically include the server, the switch, the camera, the storage medium, the management service, the distributing-forwarding service, and the storage service and the like; the corresponding relationship between the fault events and the alarm information includes one-to-one correspondence between the alarm types, the alarm objects and the fault events; and in some embodiments, the fault events may specifically include the management server being disconnected, the distributing-forwarding server being disconnected, the storage server being disconnected, the switch being disconnected (IP route location), the camera being offline, the storage medium being abnormal, the management service being offline, the distributing-forwarding service being offline, the storage service being offline, the management service being offline, the management service being overloaded, the distributing-forwarding service being overloaded, the storage service being overloaded, etc. Table 1 below is an exemplary representation of the corresponding relationship between the fault events and the alarm information.

TABLE 1

Corresponding Relationship between Fault Events and Alarm Information

| Trouble-shooting Type | Alarm Type | Category of Alarm Objects | Fault Event |
|---|---|---|---|
| trouble-shooting of hardware fault | network link disconnection alarm | server | management server being disconnected |
| | | | distributing-forwarding server being disconnected |
| | | | storage server being disconnected |
| | | switch | switch being disconnected (IP route location) |
| | | camera | camera being offline |
| | | storage medium | storage medium being abnormal |
| trouble-shooting of service fault | service status offline alarm | management service | management service being offline |
| | | distributing-forwarding service | distributing-forwarding service being offline |
| | | storage service | storage service being offline |
| trouble-shooting of | overload alarm of load | management service | management service being overloaded |
| | | distributing- | distributing-forwarding |

TABLE 1-continued

Corresponding Relationship between Fault Events and Alarm Information

| Trouble-shooting Type | Alarm Type | Category of Alarm Objects | Fault Event |
|---|---|---|---|
| cluster fault | capacity | forwarding service storage service | service being overloaded storage service being overloaded |

Figure 5:
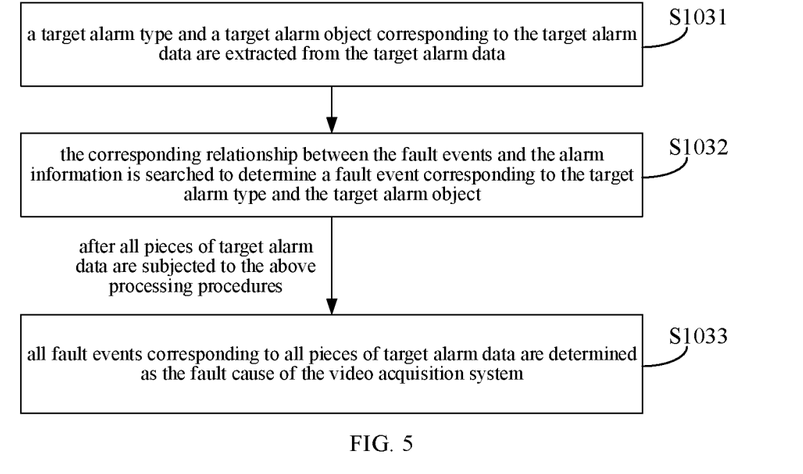
FIG. 5 is a flowchart illustrating a specific implementation of step S103 according to the embodiments of the present disclosure.

Correspondingly, with reference to FIG. 5 which exemplarily illustrates a specific implementation of the step S103 according to the embodiments of the present disclosure, the step S103 may specifically include:

performing the following steps S1031 and S1032 on each piece of target alarm data.

In step S1031, a target alarm type and a target alarm object corresponding to the target alarm data are extracted from the target alarm data.

In step S1032, the corresponding relationship between the fault events and the alarm information is searched to determine a fault event corresponding to the target alarm type and the target alarm object.

After all pieces of target alarm data are subjected to the above processing procedures, step S1033 is performed.

In step S1033, all fault events corresponding to all pieces of target alarm data are determined as the fault cause of the video acquisition system.

In this implementation, by matching the alarm information in each piece of target alarm data screened out with the preset corresponding relationship between the fault events and the alarm information, the fault event corresponding to each piece of target alarm data can be determined, and a combination of all the fault events is taken as the fault cause of the video acquisition system. For example, if the fault events corresponding to two pieces of target alarm data are the storage medium being abnormal and the management service being overloaded, it can be determined that the cause of the current fault is: the storage medium being abnormal and the management service being overloaded.

With the fault location method provided by the embodiments of the present disclosure, the target alarm data relevant to the current fault is screened out from the massive alarm data based on the network identifier of the target camera corresponding to the target video having the fault, and the fault event corresponding to the target alarm data is determined by matching the target alarm data screened out with the preset corresponding relationship between the fault events and the alarm information, thus determining the cause of the current fault. Compared with the prior art, the fault location method provided by the present disclosure can realize cause location for the video having the fault, so that a workload of operation and maintenance administrators can be reduced, and operation and maintenance efficiency can be increased, thereby increasing system operation efficiency.

Figure 6:
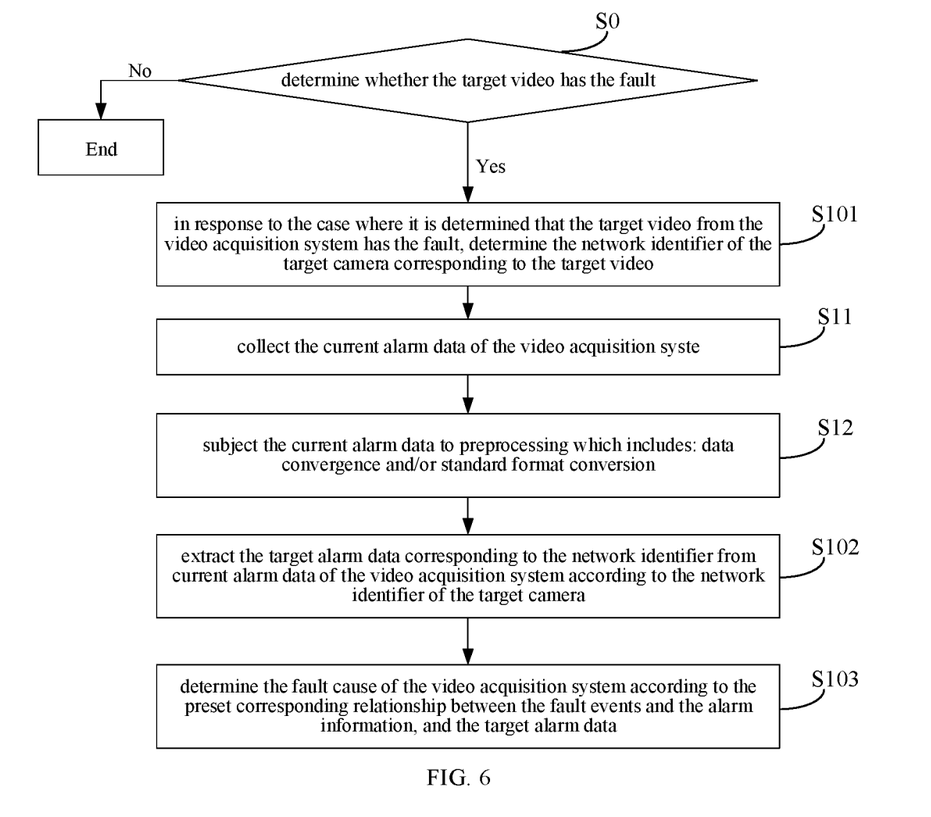
FIG. 6 is a flowchart illustrating another fault location method according to the embodiments of the present disclosure.

FIG. 6 is a flowchart illustrating another fault location method according to the embodiments of the present disclosure.

With reference to FIG. 6, in addition to including the steps S101 to S103 according to the above embodiments, the fault location method provided by the embodiments of the present disclosure further includes steps S11 and S12.

Specifically, according to the embodiments of the present disclosure, before the step S102, the fault location method further includes:

step S11, collecting the current alarm data of the video acquisition system; and step S12, subjecting the current alarm data to preprocessing which includes: data convergence and/or standard format conversion.

In the embodiments, the fault location system collects the alarm data generated in an operation process of the video acquisition system. Specifically, the hardware devices such as the full-rail camera, the switch and each server are connected to the fault location system through multi-protocol IPMI (Intelligent Platform Management Interface) \SNMP (Simple Network Management Protocol)\Zabbix Agent\Restful\TCP (Transmission Control Protocol) \PING\railway standard video data interfaces or other customizable interfaces, so as to allow the fault location system to collect the alarm data from the hardware devices; and the software system may transmit the alarm data to the fault location system through a preset interface.

In practical applications, the alarm data currently collected by the fault location system may include some repetitive data (for example, when the hardware or the software sends out an alarm at preset time intervals), and the repetitive data may cause some unnecessary computation in a subsequent analysis process for fault location, which may affect analysis efficiency. According to the embodiments of the present disclosure, by preprocessing the alarm data before the fault location is performed, the alarm data is simpler, and thus the analysis efficiency can be improved. The preprocessing includes the data convergence and/or the standard format conversion.

Specifically, the data convergence refers to filtering out the same or similar alarm data in consecutive time periods; and the standard format conversion refers to uniformly converting the alarm data into a standard data format of the fault location system.

In some embodiments, the fault location system may collect the alarm data through the software zabbix, and achieve the data convergence of the alarm data. It should be noted that the data convergence is a mature technique in the art, and thus will not be described herein.

In some embodiments, when the standard format conversion is performed on the alarm data, the fault location system may send the alarm data to a data access bus through MQ (Message Queue)/Restful/TCP data interfaces or other customizable interfaces, and the standard format conversion is carried out by the data access bus.

Still with reference to FIG. 6, in some embodiments, the fault location system further has a video fault diagnosis function. Specifically, in those embodiments, before the step S101, the fault location method further includes: step S0, determining whether the target video has the fault.

The video service system sends the target video to the fault location system through a railway standard A interface for the fault location system to perform fault determination on the target video.

Specifically, in some embodiments, when the target video is the real-time video, the step S0 specifically includes: diagnosing whether the real-time video has a problem of no video signal.

In some other embodiments, when the target video is the pre-recorded and pre-stored video, the step S0 specifically includes: diagnosing whether the pre-recorded video has a video loss problem. The video loss problem may include that the target video cannot be played or the target video cannot be found.

In some embodiments, the techniques such as image recognition and deep learning may be used to determine whether the real-time video has the problem of no video signal or whether the pre-recorded video has the video loss problem.

Figure 7:
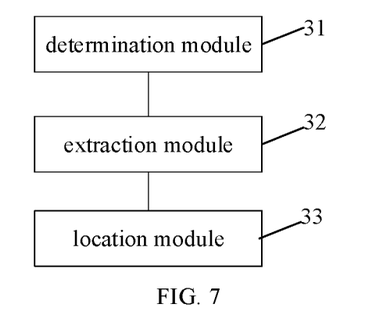
FIG. 7 is a schematic structural diagram of a fault location system according to the embodiments of the present disclosure.

FIG. 7 is a schematic structural diagram of a fault location system according to the embodiments of the present disclosure. With reference to FIG. 7, the fault location system according to the embodiments of the present disclosure includes: a determination module 31, an extraction module 32, and a location module 33. The determination module 31 is configured to determine, in response to a case where it is determined that a target video from a video acquisition system has a fault, a network identifier of a target camera corresponding to the target video; the extraction module 32 is configured to extract target alarm data corresponding to the network identifier from current alarm data of the video acquisition system according to the network identifier of the target camera determined by the determination module 31; and the location module 33 is configured to determine a fault cause of the video acquisition system according to a preset corresponding relationship between fault events and alarm information, and the target alarm data extracted by the extraction module 32.

The fault location system provided by the embodiments of the present disclosure realizes location and analysis of the fault cause of the failed video, so that the workload of the operation and maintenance administrators can be reduced, and the operation and maintenance efficiency can be increased, thereby increasing the system operation efficiency.

Figure 8:
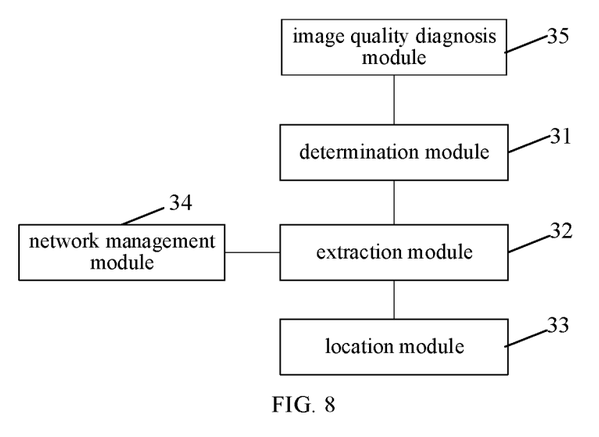
FIG. 8 is a schematic structural diagram of another fault location system according to the embodiments of the present disclosure.

FIG. 8 is a schematic structural diagram of another fault location system according to the embodiments of the present disclosure.

With reference to FIG. 8, in some embodiments, in addition to including the determination module 31, the extraction module 32, and the location module 33 provided by the above embodiments, the fault location system further includes: a network management module 34.

The network management module 34 is configured to collect the current alarm data of the video acquisition system, and subject the current alarm data to preprocessing which includes: data convergence and/or standard format conversion. In the embodiments of the present disclosure, the network management module 34 may adopt a network management server.

Still with reference to FIG. 8, in some embodiments, the fault location system further includes an image quality diagnosis module 35.

The image quality diagnosis module 35 is configured to determine whether the target video has the fault. In the embodiments of the present disclosure, the image quality diagnosis module 35 may adopt an image diagnosis server.

The fault location system provided by the embodiments of the present disclosure is configured to implement the fault location method provided by the above embodiments of the present disclosure. Reference may be made to the description of the corresponding steps in the above method embodiments for the functional modules included in the fault location system and the interaction among the functional modules, which are not described here.

The embodiments of the present disclosure further provide a video management system, including a video acquisition system and a fault location system. As shown in FIG. 1, the video acquisition system includes the front-end camera 1 and the video service system 2, and the fault location system 3 adopts the fault location system provided by the above embodiments of the present disclosure.

Finally, it should be noted that the above embodiments are only used to describe the technical solutions of the present disclosure, rather than limiting the technical solutions; although the present disclosure is described in detail in conjunction with the above embodiments, it should be understood by those of ordinary skill in the art that: modifications can still be made to the technical solutions described in each of the above embodiments, or equivalent replacements can still be made to some technical features in the technical solutions, and the modifications or the replacements do not cause the essence of the corresponding technical solutions to deviate from the spirit and the scope of the technical solutions provided by each of the above embodiments of the present disclosure.

What is claimed is:

1. A fault location method, performed by a fault location system, and comprising:
   determining, in response to a case where it is determined that a target video from a video acquisition system has a fault, a network identifier of a target camera corresponding to the target video;
   extracting target alarm data corresponding to the network identifier from current alarm data of the video acquisition system according to the network identifier of the target camera; and
   determining a fault cause of the video acquisition system according to a preset corresponding relationship between fault events and alarm information, and the target alarm data, wherein the preset corresponding relationship between fault events and alarm information is stored in the fault location system, and
   wherein the alarm information comprises: alarm types and alarm objects, and the corresponding relationship between the fault events and the alarm information comprises: the corresponding relationship between the alarm types, the alarm objects, and the fault events;
   determining the fault cause of the video acquisition system according to the preset corresponding relationship between the fault events and the alarm information, and the target alarm data comprises:
   performing, for each piece of target alarm data, the following processing procedures:
   extracting a target alarm type and a target alarm object corresponding to the target alarm data from the target alarm data; and
   searching the corresponding relationship between the fault events and the alarm information to determine a fault event corresponding to the target alarm type and the target alarm object; and
   determining, after all pieces of target alarm data are subjected to the above processing procedures, all fault events corresponding to all pieces of target alarm data as the fault cause of the video acquisition system.

2. The method of claim 1, wherein the alarm types comprise: a disconnection alarm of network link, an offline alarm of service status, and an overload alarm of load capacity.

3. The method of claim 1, before extracting the target alarm data corresponding to the network identifier from the current alarm data of the video acquisition system according to the network identifier of the target camera, further comprising:
   collecting the current alarm data of the video acquisition system; and
   subjecting the current alarm data to preprocessing which comprises: data convergence and/or standard format conversion.

4. The method of claim 1, before determining, in response to the case where it is determined that the target video from the video acquisition system has the fault, the network identifier of the target camera corresponding to the target video, further comprising:
   determining whether the target video has the fault.

5. The method of claim 4, wherein the target video comprises: a real-time video; and
   determining whether the target video has the fault comprises:
   diagnosing whether the real-time video has a problem of no video signal.

6. The method of claim 4, wherein the target video comprises: a pre-recorded video; and
   determining whether the target video has the fault comprises:
   diagnosing whether the pre-recorded video has a video loss problem.

7. A fault location system, comprising:
   a determination module configured to determine, in response to a case where it is determined that a target video from a video acquisition system has a fault, a network identifier of a target camera corresponding to the target video;
   an extraction module configured to extract target alarm data corresponding to the network identifier from current alarm data of the video acquisition system according to the network identifier of the target camera determined by the determination module; and
   a location module configured to determine a fault cause of the video acquisition system according to a preset corresponding relationship between fault events and alarm information, and the target alarm data extracted by the extraction module, wherein the preset corresponding relationship between fault events and alarm information is stored in the fault location system, and
   wherein the alarm information comprises: alarm types and alarm objects, and the corresponding relationship between the fault events and the alarm information comprises: the corresponding relationship between the alarm types, the alarm objects, and the fault events;
   determining the fault cause of the video acquisition system according to the preset corresponding relationship between the fault events and the alarm information, and the target alarm data comprises:
   performing, for each piece of target alarm data, the following processing procedures:
   extracting a target alarm type and a target alarm object corresponding to the target alarm data from the target alarm data; and
   searching the corresponding relationship between the fault events and the alarm information to determine a fault event corresponding to the target alarm type and the target alarm object; and
   determining, after all pieces of target alarm data are subjected to the above processing procedures, all fault events corresponding to all pieces of target alarm data as the fault cause of the video acquisition system.

8. The system of claim 7, further comprising:
   a network management module configured to collect the current alarm data of the video acquisition system, and subject the current alarm data to preprocessing which comprises: data convergence and/or standard format conversion.

9. The system of claim 7, further comprising:
   an image quality diagnosis module configured to determine whether the target video has the fault.

10. A video management system, comprising:
a video acquisition system comprising a front-end camera and a video service system, with the front-end camera configured to take videos, and the video service system configured to receive the videos captured by the front-end camera and provide a video service for a client; and
a fault location system comprising the fault location system of claim 7.

11. The video management system of claim 10, wherein the video service system comprises: a management server, a distributing-forwarding server, a switch, and a storage server.

* * * * *